(12) United States Patent
Chiba et al.

(10) Patent No.: US 12,219,674 B2
(45) Date of Patent: Feb. 4, 2025

(54) WINDSHIELD

(71) Applicant: Nippon Sheet Glass Company, Limited, Tokyo (JP)

(72) Inventors: Kazuki Chiba, Tokyo (JP); Hisashi Ogawa, Tokyo (JP); Hisashi Asaoka, Tokyo (JP); Kazuhisa Ono, Tokyo (JP); Yota Yano, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 546 days.

(21) Appl. No.: 17/639,246

(22) PCT Filed: Sep. 1, 2020

(86) PCT No.: PCT/JP2020/033132
§ 371 (c)(1),
(2) Date: Feb. 28, 2022

(87) PCT Pub. No.: WO2021/040055
PCT Pub. Date: Mar. 4, 2021

(65) Prior Publication Data
US 2022/0338311 A1    Oct. 20, 2022

(30) Foreign Application Priority Data
Sep. 1, 2019    (JP) .................................. 2019-159197

(51) Int. Cl.
*B32B 7/12*    (2006.01)
*B60J 1/02*    (2006.01)
(Continued)

(52) U.S. Cl.
CPC .................. *H05B 3/86* (2013.01); *B60J 1/02* (2013.01); *B60R 2011/0026* (2013.01); *B60R 11/04* (2013.01)

(58) Field of Classification Search
CPC .. B32B 3/02; B32B 3/08; B32B 3/085; B32B 7/12; B32B 17/10036; B32B 17/10385
See application file for complete search history.

(56) References Cited

U.S. PATENT DOCUMENTS

| | | |
|---|---|---|
| 2016/0119509 A1 | 4/2016 | Wato |
| 2020/0154528 A1 | 5/2020 | Gima et al. |
| 2022/0338310 A1* | 10/2022 | Yano ................. B32B 17/10348 |

FOREIGN PATENT DOCUMENTS

| | | |
|---|---|---|
| JP | 4-14790 A | 1/1992 |
| JP | 11-317284 A | 11/1999 |

(Continued)

OTHER PUBLICATIONS

Japanese Office Action for Japanese Application No. 2021-543102, dated Jul. 9, 2024, with English translation.

(Continued)

*Primary Examiner* — Elizabeth E Mulvaney
(74) *Attorney, Agent, or Firm* — Birch, Stewart, Kolasch & Birch, LLP

(57) ABSTRACT

The present invention provides a windshield on which an information acquisition device that acquires information from outside of a vehicle by emitting and/or receiving light is disposable, the windshield including: a glass plate; and a heating wire that is provided on the glass plate and to which a current is applied. The glass plate includes at least one information acquisition region that faces the information acquisition device and through which the light passes, the heating wire includes a plurality of linear main body portions that pass through at least the information acquisition region and a linear linking portion for linking the plurality of main body portions, and at least one of the linking portions includes a heat generation suppressing means for suppressing heat generation when a current is applied.

18 Claims, 8 Drawing Sheets

(51) Int. Cl.
    *H05B 3/86*     (2006.01)
    *B60R 11/00*    (2006.01)
    *B60R 11/04*    (2006.01)

(56) References Cited

FOREIGN PATENT DOCUMENTS

| | | |
|---|---|---|
| JP | 2006-96331 A | 4/2006 |
| JP | 2016-78807 A | 5/2016 |
| JP | 2017-114484 A | 6/2017 |
| JP | 2017-216193 A | 12/2017 |
| JP | 2020-126706 A | 8/2020 |
| WO | WO2019/039318 A1 | 2/2019 |

OTHER PUBLICATIONS

International Search Report for PCT/JP2020/033132 (PCT/ISA/210) mailed on Nov. 17, 2020.
Written Opinion of the International Searching Authority for PCT/JP2020/033132 (PCT/ISA/237) mailed on Nov. 17, 2020.
Japanese Office Action for Japanese Application No. 2021-543102, dated Apr. 2, 2024, with English translation.

\* cited by examiner

WINDSHIELD

TECHNICAL FIELD

The present invention relates to a windshield on which an information acquisition device for acquiring information from the outside of a vehicle by emitting and/or receiving light can be disposed.

BACKGROUND ART

In recent years, safety performance of automobiles has dramatically improved. In order to avoid a collision with a preceding vehicle, as an example, a safety system is proposed in which the distance to the preceding vehicle and the speed of the preceding vehicle are detected and a brake automatically engages in an abnormal approach to the preceding vehicle. In such a system, the distance to the preceding vehicle and the like are measured using a laser radar or a camera. In general, a laser radar or a camera is disposed on the inner side of a windshield, and the measurements are performed by emitting light such as infrared rays forward (e.g., Patent Literature 1).

CITATION LIST

Patent Literature

Patent Literature 1: JP 2006-96331A

SUMMARY OF INVENTION

Technical Problem

As described above, a measuring apparatus such as a laser radar or a camera is disposed on an inner surface side of a glass plate constituting a windshield, and emits or receives light via the glass plate. Incidentally, the glass plate sometimes fogs up on cold days or in cold regions. However, if the glass plate fogs up, a measuring apparatus may not be able to accurately emit or receive light. Accordingly, there is also the possibility of the distance between vehicles or the like not being calculated accurately.

Such an issue may arise not only in devices for measuring the distance between vehicles but also in information acquisition devices in general that acquire information from the outside of a vehicle by receiving light emitted by cameras and ETCs, for example. The present invention was made in order to resolve the foregoing issues, and it is an object thereof to provide a windshield to which an information acquisition device configured to emit and/or receive light via a glass plate is attachable, the windshield allowing accurate light emission and/or light reception, and allowing accurate information processing.

Solution to Problem

Item 1. A windshield on which an information acquisition device that acquires information from outside of a vehicle by emitting and/or receiving light is disposable, the windshield including:
  a glass plate; and
  a heating wire that is provided on the glass plate and to which a current is applied,
  in which the glass plate includes at least one information acquisition region that faces the information acquisition device and through which the light passes,
  the heating wire includes a plurality of linear main body portions that pass through at least the information acquisition region and a linear linking portion for linking the plurality of main body portions, and
  at least one of the linking portions includes a heat generation suppressing means for suppressing heat generation when a current is applied.

Item 2. The windshield according to Item 1,
  in which at least one of the linking portions includes at least one bent portion as the heat generation suppressing means, and
  a resistance value of the bent portion per unit length is smaller than a resistance value of the main body portions per unit length.

Item 3. The windshield according to Item 1 or 2,
  in which, as the heat generation suppressing means, a resistance value of the linking portion per unit length is smaller than a resistance value of the main body portions per unit length.

Item 4. The windshield according to any one of Items 1 to 3,
  in which at least one of the linking portions includes at least one bent portion, and
  at least one of the linking portions includes at least one bypass heating wire.

Item 5. The windshield according to Item 4,
  in which at least one of the linking portions includes two of the bypass heating wires.

Item 6. The windshield according to Item 4,
  in which all of the linking portions include two of the bypass heating wires.

Item 7. The windshield according to any one of Items 2 to 6,
  in which the width of at least a portion of the bent portion is larger than the width of a portion of the linking portion other than the bent portion.

Item 8. The windshield according to any one of Items 2 to 7,
  in which the thickness of at least a portion of the bent portion is larger than the thickness of a portion of the linking portion other than the bent portion.

Item 9. The windshield according to any one of Items 2 to 8,
  in which an angle formed by the heating wire that constitutes the bent portion is 15 to 60 degrees.

Item 10. The windshield according to any one of Items 2 to 9,
  in which the bent portion has a length of 1 to 20 mm.

Item 11. The windshield according to any one of Items 2 to 10,
  in which the width of the bent portion is 1.2 times or more the width of a portion of the linking portion other than the bent portion.

Item 12. The windshield according to any one of Items 2 to 11,
  in which at least a portion of the bent portion has a width of 0.3 to 1.0 mm.

Item 13. The windshield according to any one of Items 2 to 12,
  in which the thickness of the bent portion is 1.2 times or more the thickness of a portion of the linking portion other than the bent portion.

Item 14. The windshield according to any one of Items 2 to 13,
  in which the bent portion is formed in an arc shape.

Item 15. The windshield according to Item 14, in which the radius of curvature of the bent portion is 1 to 10 mm.

Item 16. The windshield according to any one of Items 2 to 15,
in which the bent portion is provided with a conductive portion whose outer diameter is larger than the width of the heating wire constituting the bent portion.

Item 17. The windshield according to Item 16,
in which the maximum outer diameter of the conductive portion is 10 mm or less.

Item 18. The windshield according to any one of Items 1 to 17,
in which the plurality of main body portions are disposed substantially parallel to each other, and
the interval between the main body portions is 1.2 times or more the width of the heating wire.

Item 19. The windshield according to any one of Items 1 to 18,
in which the number of main body portions is 3 to 50.

Item 20. The windshield according to any one of Items 1 to 19,
in which the total area of the plurality of main body portions is 2500 mm$^2$ or more.

Item 21. The windshield according to any one of Items 1 to 20,
in which each main body portion is inclined at an angle α of 30 degrees or less with respect to a horizontal direction.

Item 22. The windshield according to any one of Items 1 to 21,
in which at least one of the linking portions includes at least one bent portion as the heat generation suppressing means, and
a temperature difference dT defined at the bent portion is less than 15° C.,
where dT is |b−s|, s is an average temperature of two portions of the heating wire that are located 35 mm away from a vertex portion of the bent portion, and b is the temperature of the heating wire at the vertex portion.

Advantageous Effects of Invention

According to the present invention, with a windshield to which an information acquisition device configured to emit and/or receive light via a glass plate is attachable, it is possible to accurately emit and/or receive light and to accurately perform information processing.

DESCRIPTION OF EMBODIMENTS

Figure 1:
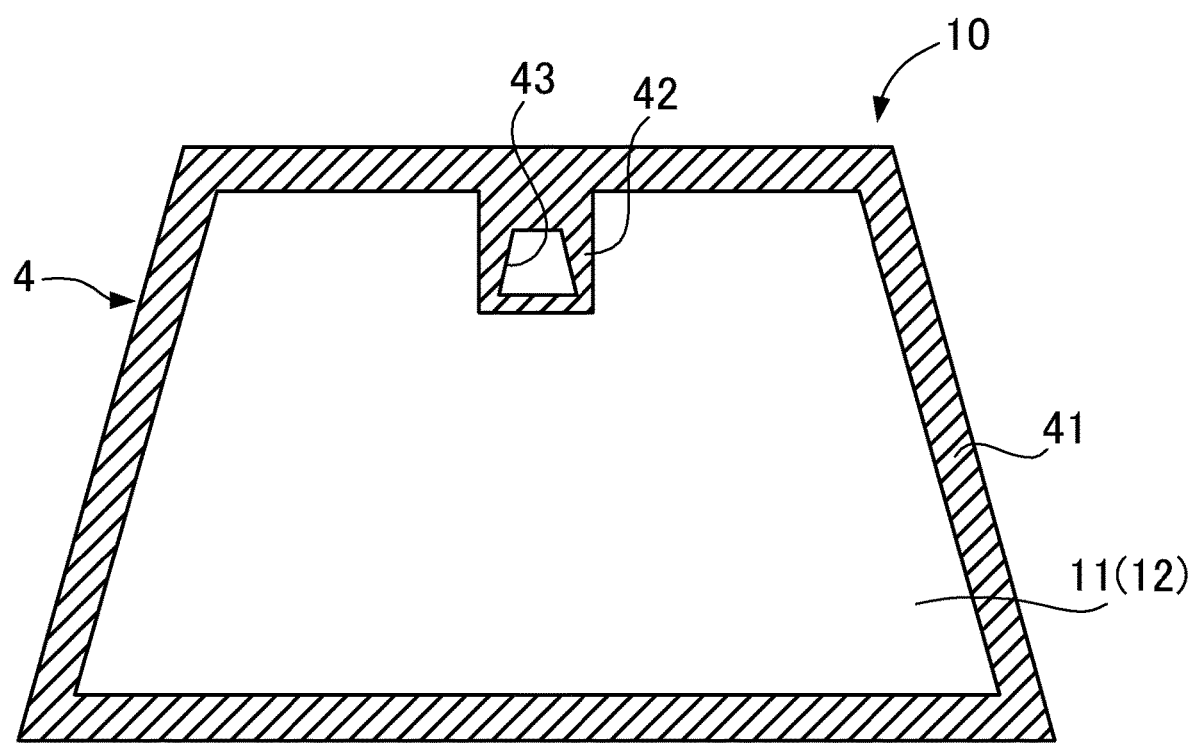
FIG. 1 is a plan view showing an embodiment of a windshield according to the present invention.
Figure 2:
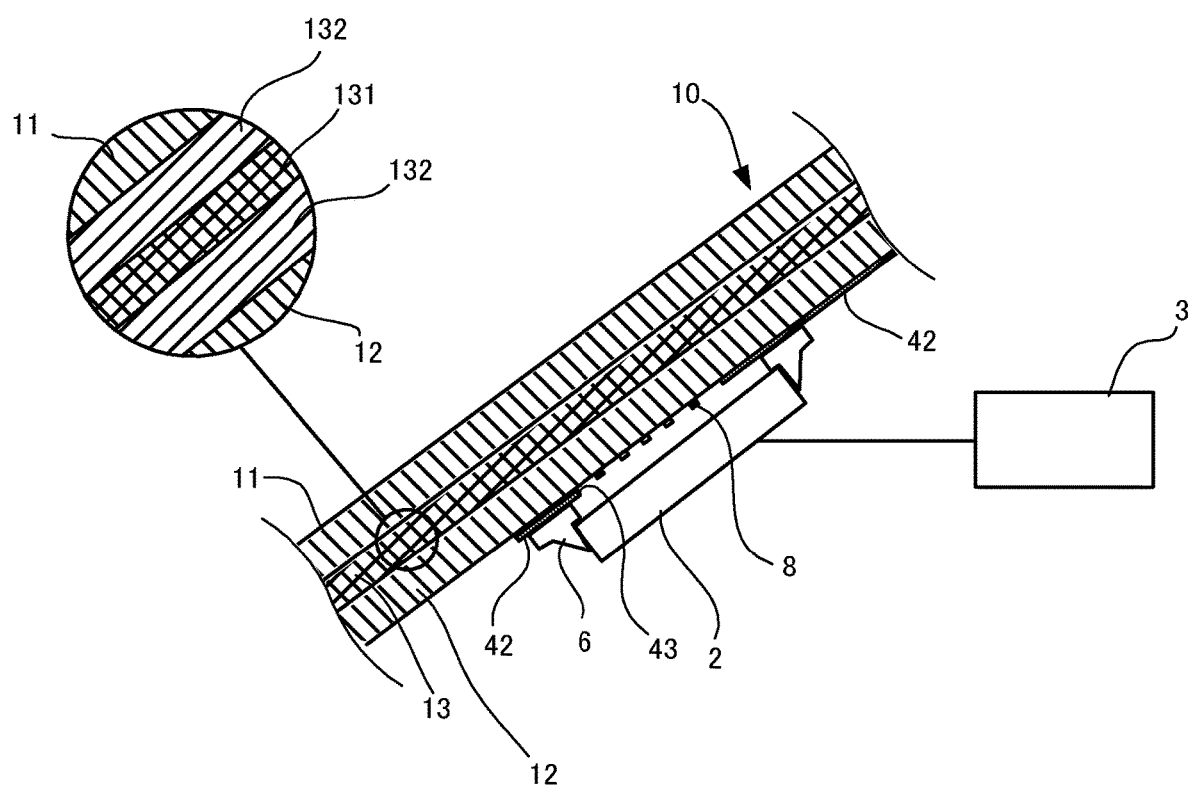
FIG. 2 is a cross-sectional view of FIG. 1.

First, a configuration of a windshield according to this embodiment will be described using FIGS. 1 and 2. FIG. is a plan view of the windshield, and FIG. 2 is a cross-sectional view of FIG. 1. Note that the "up-down direction" in FIG. 1 refers to "upper and lower", "perpendicular", and "vertical", and the "left-right direction" in FIG. 1 refers to "horizontal" for convenience of description. FIG. 1 illustrates a windshield as viewed from the vehicle interior side. That is to say, the back side of the paper plane of FIG. 1 refers to the vehicle exterior side, and the front side of the paper plane of FIG. 1 refers to the vehicle interior side.

This windshield is provided with a trapezoidal laminated glass 10, and is installed in a vehicle body in an inclined state. The laminated glass 10 includes an outer glass plate 11, an inner glass plate 12, and an interlayer 13 disposed therebetween. Then, a blocking layer 4 is layered on the vehicle interior side of the inner glass plate 12, and the field of view from the outside of the vehicle is blocked by this blocking layer 4. Also, the blocking layer 4 is provided with an opening 43, and images of the outside of the vehicle can be taken by the imaging device 2 disposed inside the vehicle via the opening 43. That is, this opening 43 constitutes an imaging window. Also, a frame-shaped bracket 6 is fixed to the blocking layer 4 of the inner glass plate 12, and the imaging device 2 is attached to the bracket 6. Because the bracket 6 is fixed to the blocking layer 4 that is formed in a frame shape, the bracket 6 cannot be seen from the outside of the vehicle. Furthermore, a heating wire 8 is disposed on the inner glass plate 12 so as to pass through the opening 43. Hereinafter, constituent elements will be described in detail.

1. Laminated Glass

Figure 3:
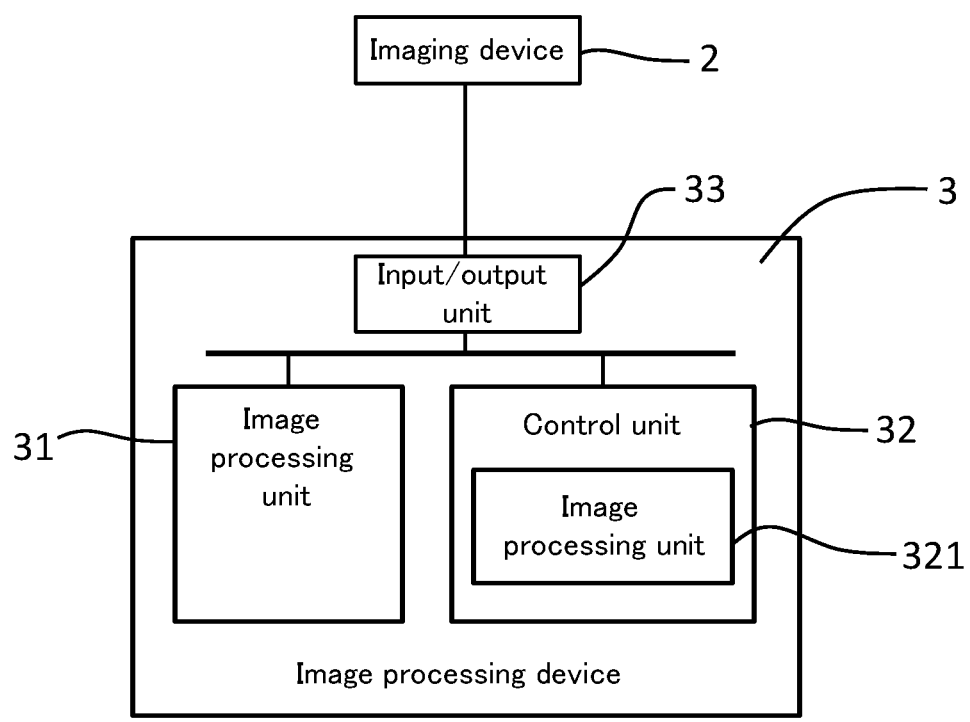
FIG. 3 is a block view showing a schematic configuration of an in-vehicle system.

FIG. 3 is a cross-sectional view of a laminated glass. As shown in FIG. 3, this laminated glass 10 includes an outer glass plate 11 and an inner glass plate 12, and a resin interlayer 13 is disposed between the glass plates 11 and 12. Hereinafter, the configuration thereof will be described.

1-1. Glass Plate

First, the outer glass plate 11 and the inner glass plate 12 will be described. Known glass plates can be used as the outer glass plate 11 and the inner glass plate 12, and these glass plates can also be made of heat-ray absorbing glass, regular clear glass or green glass, or UV green glass. However, the glass plates 11 and 12 are required to attain a visible light transmittance that conforms to the safety standards of a country in which the automobile is to be used. An adjustment can be made so that the outer glass plate 11 ensures a required solar absorptance and the inner glass plate 12 provides a visible light transmittance that meets the safety standards, for example. An example of clear glass, an example of heat-ray absorbing glass, and an example of soda-lime based glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R represents an alkali metal)
Total iron oxide (T-$Fe_2O_3$) in terms of $Fe_2O_3$: 0.08 to 0.14 mass %

Heat-Ray Absorbing Glass
With regard to the composition of heat-ray absorbing glass, a composition obtained based on the composition of clear glass by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of glass by an amount corresponding to the increases in T-$Fe_2O_3$, $CeO_2$, and $TiO_2$ can be used, for example.

Soda-Lime Based Glass $SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) in terms of $Fe_2O_3$: 0.02 to 0.03 mass %

Although there is no particular limitation on the thickness of the laminated glass 10 according to this embodiment, it is possible to set the total thickness of the outer glass plate 11 and the inner glass plate 12 to 2.1 to 6 mm, for example, and, from the viewpoint of weight reduction, the total thickness of the outer glass plate 11 and the inner glass plate 12 is preferably set to 2.4 to 3.8 mm, more preferably 2.6 to 3.4 mm, and particularly preferably 2.7 to 3.2 mm. As described above, there is a need to reduce the total thickness of the outer glass plate 11 and the inner glass plate 12 in order to reduce the weight. Therefore, although there is no particular limitation on the thicknesses of the glass plates, the thicknesses of the outer glass plate 11 and the inner glass plate 12 can be determined as described below, for example.

The outer glass plate 11 is mainly required to have durability and impact resistance against external hazards. When this outer glass plate is used for a windshield of an automobile, impact-resistance against flying objects such as small stones is required. On the other hand, increasing the thickness increases the weight, which is not preferable. From this viewpoint, the thickness of the outer glass plate 11 is preferably 1.8 to 2.3 mm, and more preferably 1.9 to 2.1 mm. The thickness to be used can be determined in accordance with the application of the glass plate.

Although the thickness of the inner glass plate 12 can be made equal to that of the outer glass plate 11, the thickness of the inner glass plate 12 can be made smaller than that of the outer glass plate 11 in order to reduce the weight of the laminated glass 10, for example. Specifically, when glass strength is taken into consideration, the thickness is preferably 0.6 to 2.0 mm, more preferably 0.8 to 1.6 mm, and particularly preferably 1.0 to 1.4 mm. Furthermore, the thickness is preferably 0.8 to 1.3 mm. With regard to the inner glass plate 12 as well, the thickness to be used can be determined in accordance with the application of the glass plate.

Here, an example of a method of measuring the thickness of a curved glass plate (laminated glass) 1 will be described. First, with respect to the measurement position, the measurement is performed at two positions: an upper position and a lower position on a center line S extending vertically through the center of a glass plate in the horizontal direction. Although there is no particular limitation on the measuring apparatus, a thickness gauge such as SM-112 manufactured by TECLOCK Corporation can be used, for example. During measurement, the glass plate is disposed such that the curved surface of the glass plate is placed on a flat surface, and an end portion of the glass plate is sandwiched by and measured with the thickness gauge. Note that a flat glass plate can also be measured in the same manner as a curved glass plate.

1-2. Interlayer

The interlayer 13 includes at least one layer. For example, as shown in FIG. 3, the interlayer 13 can be constituted by three layers, namely a soft core layer 131 and outer layers 132 that are harder than the core layer 131 and between which the core layer 131 is interposed. However, there is no limitation to this configuration, and it is sufficient that the interlayer 13 includes a plurality of layers including the core layer 131 and at least one outer layer 132 disposed on the outer glass plate 11 side. For example, the interlayer 13 including two layers, namely the core layer 131 and one outer layer 132 disposed on the outer glass plate 11 side, or the interlayer 13 in which an even number of two or more of the outer layers 132 are disposed on each side of the core layer 131 so that the core layer 131 is disposed at the center, or the interlayer 13 in which an odd number of outer layers 132 are disposed on one side of the core layer 131 and an even number of outer layers 132 are disposed on the other side so that the core layer 131 is interposed therebetween can also be formed. Note that in the case where only one outer layer 132 is provided, the outer layer 132 is provided on the outer glass plate 11 side as mentioned above, which is for the purpose of improving the breakage resistance performance with respect to an external force from the outside of a vehicle or a building. Also, when the number of outer layers 132 is increased, the sound insulation performance is improved.

There is no particular limitation on the hardness of the core layer 131 as long as the core layer 131 is softer than the outer layer 132. Although there is no particular limitation on the materials constituting the layers 131 and 132, it is possible to select materials based on the Young's modulus, for example. Specifically, at a frequency of 100 Hz and a temperature of 20° C., the Young's modulus is preferably 1 to 20 MPa, more preferably 1 to 18 MPa, and particularly preferably 1 to 14 MPa. When the Young's modulus is set to be in such a range, it is possible to prevent a decrease in sound transmission loss (STL) in a low frequency range of about 3500 Hz or lower. On the other hand, as will be described later, it is preferable that the outer layers 132 have a large Young's modulus for the purpose of improving the sound insulation performance in a high frequency range, and the Young's modulus can be set to 560 MPa or more, 600 MPa or more, 650 MPa or more, 700 MPa or more, 750 MPa or more, 880 MPa or more, or 1300 MPa or more at a frequency of 100 Hz and a temperature of 20° C. There is no particular limitation on the upper limit of the Young's modulus of each of the outer layers 132, and the Young's modulus can be set from the viewpoint of workability, for example. It is empirically known that when the Young's modulus is set to 1750 MPa or more, for example, the workability decreases, and in particular, cutting is difficult.

Also, the outer layers 132 can be made of a polyvinyl butyral resin (PVB) as a specific material, for example. Polyvinyl butyral resin has excellent adhesiveness to the glass plates and penetration resistance and is thus preferable. On the other hand, the core layer 131 can be made of an ethylene vinyl acetate resin (EVA) or a polyvinyl acetal resin, which is softer than the polyvinyl butyral resin constituting the outer layers. When the soft core layer is interposed between the outer layers, the sound insulation performance can be significantly improved while keeping adhesiveness and penetration resistance that are equivalent to those of a single-layered resin interlayer.

In general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer to be added, and the like. Accordingly, a hard polyvinyl butyral resin that is used for the outer layers 132 and a soft polyvinyl butyral resin that is used for the core layer 131 can be produced with the same polyvinyl butyral resin by appropriately adjusting at least one condition selected from the aforementioned conditions. Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin, the softer the resulting polyvinyl acetal resin tends to be. Accordingly, for example, if the outer layers 132 are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer 131. Note that there is no limitation to the above-mentioned resins and the like as long as predetermined Young's moduli can be obtained.

The total thickness of the interlayer 13 is not particularly specified, and is preferably 0.3 to 6.0 mm, more preferably 0.5 to 4.0 mm, and particularly preferably 0.6 to 2.0 mm. Also, the thickness of the core layer 131 is preferably 0.1 to 2.0 mm and more preferably 0.1 to 0.6 mm. Meanwhile, the thickness of each of the outer layers 132 is preferably 0.1 to 2.0 mm and more preferably 0.1 to 1.0 mm. Alternatively, it is also possible to fix the total thickness of the interlayer 13 and adjust the thickness of the core layer 131 without exceeding the fixed total thickness.

The thicknesses of the core layer 131 and the outer layers 132 can be measured as described below, for example. First, the cross section of a laminated glass is enlarged by a factor of 175 and displayed using a microscope (e.g., VH-5500 manufactured by Keyence Corporation). Then, the thicknesses of the core layer 131 and the outer layers 132 are visually identified and measured. At this time, in order to eliminate variations seen in visual identification, the measurement is performed five times, and average values are taken as the thicknesses of the core layer 131 and the outer layers 132. For example, the core layer and the outer layers 132 are identified in an enlarged photograph of a cross-section of a laminated glass, and the thicknesses of the identified core layer and outer layers 132 are measured.

Note that the core layer 131 and the outer layers 132 of the interlayer 13 are not required to have a constant thickness over the entire surface. For example, the core layer 131 and the outer layers 132 can also have a wedge shape so as to be suited to a laminated glass that is used for a head-up display. In this case, the thicknesses of the core layer 131 and the outer layers 132 of the interlayer 13 are measured at positions having the smallest thickness, that is, in the lowest side portion of the laminated glass. If the interlayer 13 has a wedge shape, the outer glass plate and the inner glass plate are not disposed in parallel, but it should be construed that such an arrangement is also included in the arrangement of the glass plates of the present invention. That is, the arrangement according to the present invention includes the arrangement of the outer glass plate and the inner glass plate when the interlayer 13 including the core layer 131 and the outer layers 132 whose thicknesses increase at a rate of change of 3 mm or less per meter is used, for example.

Although there is no particular limitation on the method of manufacturing the interlayer 13, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or a multilayer structure. Also, the interlayer 13 may include a single layer instead of the plurality of layers as mentioned above.

2. Overview of Blocking Layer

Next, the blocking layer 4 will be described. As shown in FIG. 1, the blocking layer 4 includes a peripheral edge portion 41 layered along the entire peripheral edge of the inner glass plate 12, and a rectangular extension portion 42 that is linked to the peripheral edge portion 41 and extends downward from the vicinity of the center of the upper side of the inner glass plate 12. A trapezoidal opening 43 is formed in a lower end portion of the extension portion 42, and the imaging device 2 attached to the vehicle interior side can take images of the outside of the vehicle via this opening 43 and the laminated glass 10.

As shown in FIG. 2, the above-described bracket 6 is fixed to the blocking layer 4. Specifically, the bracket 6 is formed in a frame shape surrounding the opening, and is fixed to the blocking layer 4 using a piece of double-sided tape, an adhesive, or the like. Also, the bracket 6 is configured such that the imaging device 2 is supported by this bracket 6 and the imaging device 2 can take images of the outside of the vehicle through the opening 43. Also, although not shown, a cover is attached to the bracket 6 such that the imaging device 2 cannot be seen from the vehicle interior side.

Next, the material of the blocking layer 4 will be described. The material of the blocking layer 4 may be selected as appropriate according to an embodiment as long as it can block the field of view from the outside of the vehicle, and a ceramic material with a dark color such as black, brown, gray, or dark blue may be used, for example.

If a black ceramic material is selected as the material of the blocking layer 4, for example, the black ceramic material is layered through screen printing or the like on the inner surface of the inner glass plate 12 and the inner surface of the outer glass plate 11, and the layered ceramic material is heated together with the glass plates 11 and 12. Once the ceramic material has hardened, the blocking layer 4 is complete. Note that various materials can be used as the ceramic material to be used for the blocking layer 4. It is possible to use a ceramic material with a composition shown in Table 1 below for the blocking layer 4, for example.

TABLE 1

|  |  | First and second colored ceramic paste |
|---|---|---|
| Pigment*1 | mass % | 10 |
| Resin (cellulosic resin) | mass % | 10 |
| Organic solvent (pine oil) | mass % | 10 |

TABLE 1-continued

| | | First and second colored ceramic paste |
|---|---|---|
| Glass binder*2 | mass % | 70 |
| Viscosity | dPs | 150 |

*1 Main components: copper oxide, chromium oxide, iron oxide, and manganese oxide
*2 Main components: bismuth borosilicate and zinc borosilicate

3. In-Vehicle System

Next, an in-vehicle system provided with the imaging device 2 and an image processing device 3 will be described using FIGS. 2 and 3. FIG. 3 shows the configuration of the in-vehicle system. As shown in FIG. 3, the in-vehicle system according to this embodiment includes the imaging device 2 and the image processing device 3 connected to the imaging device 2.

The image processing device 3 is a device for processing images taken by the imaging device 2. This image processing device 3 includes general hardware such as a storage unit 31, a control unit 32, and an input/output unit 33 that are connected via a busbar, as a hardware configuration, for example. However, the hardware configuration of the image processing device 3 is not limited to such an example, and, with regard to a specific hardware configuration of the image processing device 3, it is possible to add, or omit and add constituent elements as appropriate according to an embodiment.

The storage unit 31 stores various data and programs used in processing executed by the control unit 32 (not shown). The storage unit 31 may be realized by a hard disk, or a recording medium such as a USB memory, for example. Also, various data and programs stored in the storage unit 31 may be acquired from a recording medium such as a CD (Compact Disc) or a DVD (Digital Versatile Disc). Furthermore, the storage unit 31 may be referred to as an "auxiliary storage".

As described above, the laminated glass 10 is disposed in an inclined orientation with respect to the vertical direction, and is curved. Also, the imaging device 2 takes images of the outside of a vehicle via such a laminated glass 10. Thus, the images taken by the imaging device 2 are deformed according to the orientation, shape, refractive index, optical defects, and the like of the laminated glass 10. Aberrations that are specific to the camera lens of the imaging device 2 also cause deformation. In view of this, the storage unit 31 may store correction data for correcting images that are deformed due to aberrations of the laminated glass 10 and the camera lens.

The control unit 32 includes one or more processors such as a microprocessor or a CPU (Central Processing Unit), and peripheral circuits (a ROM (Read Only Memory), a RAM (Random Access Memory), an interface circuit, and the like) used for processing performed by these processors. The ROM, the RAM, and the like may be called the main storages in the sense that they are located in the address space handled by the processors in the control unit 32. The control unit 32 functions as an image processing unit 321 by executing various data and programs stored in the storage unit 31.

The image processing unit 321 processes images taken by the imaging device 2. Processing performed on the captured images can be selected as appropriate according to an embodiment. The image processing unit 321 may recognize a subject present in a captured image by analyzing the captured image through pattern matching or the like, for example. In this embodiment, in order that the imaging device 2 takes images of situation forward of the vehicle, the image processing unit 321 may further determine whether or not an organism such as a human being is present on the forward side of the vehicle based on this subject recognition. Then, if a person is present on the forward side of the vehicle, the image processing unit 321 may output a warning message, using a predetermined method. Also, the image processing unit 321 may perform a predetermined process on a captured image, for example. Then, the image processing unit 321 may output the processed captured image to a display device (not shown) such as a display connected to the image processing device 3.

The input/output unit 33 is one or more interfaces for transmitting and receiving data to/from a device that is present outside the image processing device 3. The input/output unit 33 is an interface for connecting to a user interface, or an interface of a USB (Universal Serial Bus), for example. Note that the image processing device 3 is connected to the imaging device 2 via the input/output unit 33, and acquires images taken by the imaging device 2 in this embodiment.

In addition to a device designed exclusively for a service to be provided, a general-purpose device such as a PC (Personal Computer) or a tablet terminal may be used as such an image processing device 3.

Also, as described above, the imaging device 2 is attached to the bracket 6. Therefore, attachment of the imaging device 2 to the bracket 6 and attachment of the bracket to the first blocking layer 4 are adjusted such that the optical axis of the camera lens of the imaging device 2 passes through the opening 43 in this state. Also, a cover (not shown) is attached to the bracket 6 so as to cover the imaging device 2. Therefore, the imaging device 2 is disposed in the space surrounded by the laminated glass 10, the bracket, and the cover, and the imaging device 2 cannot be seen from the vehicle interior side, and only a portion of the imaging device 2 can be seen from outside the vehicle through the opening 43 due to the blocking layer 4. Also, the imaging device 2 and the above-described input/output unit 33 are connected to each other by a cable (not shown), and this cable is drawn out from the cover and is connected to the image processing device 3 disposed at a predetermined position in the vehicle.

4. Heating Wire

As described above, in this embodiment, the imaging device 2 acquires information by emitting and receiving light through the opening 43 in the blocking layer 4. Thus, if a portion of the inner glass plate 12 that corresponds to the opening 43, that is, the information acquisition region, fogs up, accurate information cannot be acquired. Therefore, in this embodiment, fogging is prevented by providing the heating wire 8 constituted by a conductive wire in the information acquisition region, and heating the heating wire by applying a current to this heating wire 8. Various wiring methods can be used for such a heating wire 8 according to the configuration of the imaging device 2 and the form of the blocking layer 4, and thus a plurality of aspects will be described below.

Figure 4:
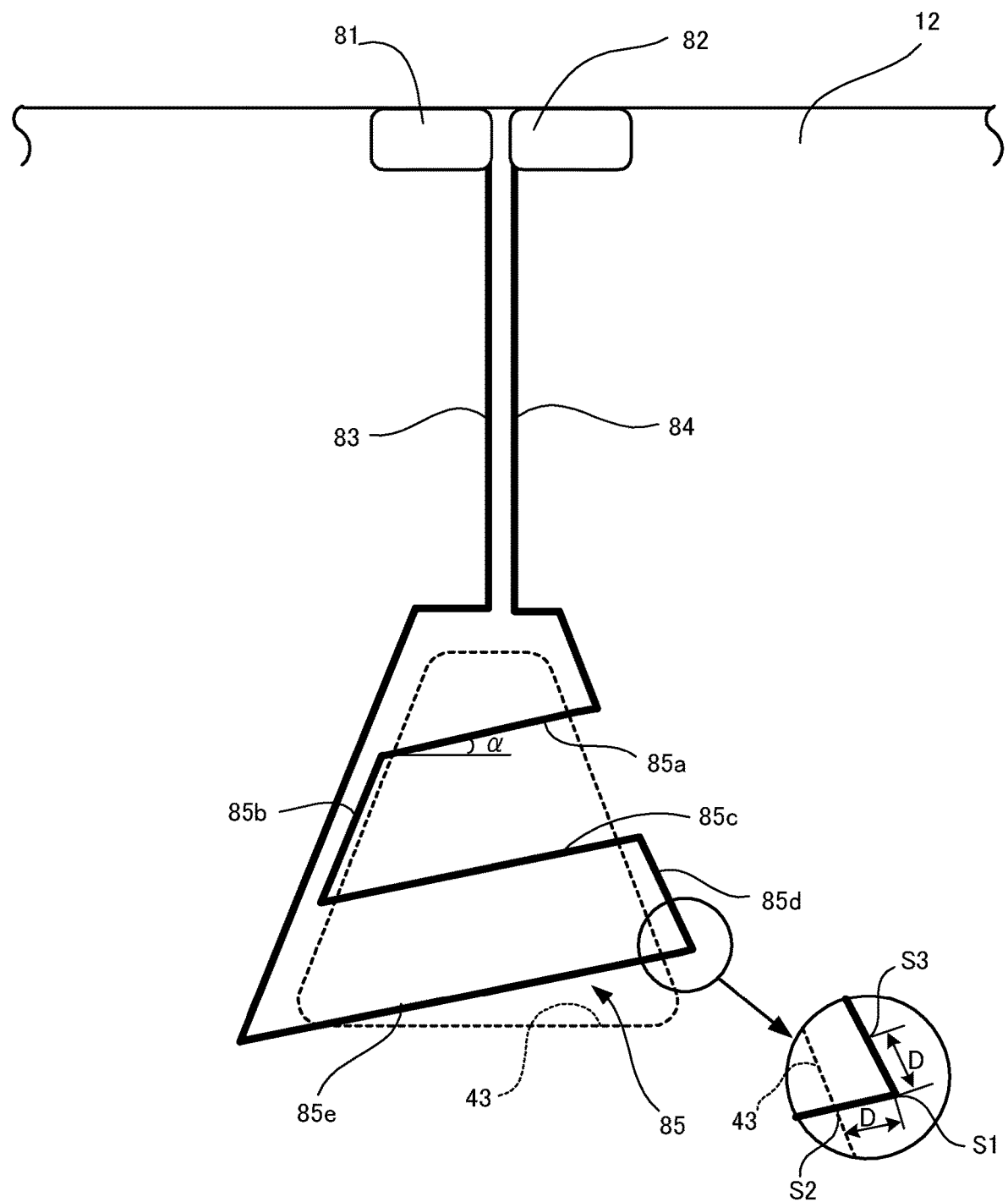
FIG. 4 is a plan view showing a heating wire.

FIG. 4 shows the heating wire 8 disposed on the inner glass plate. Although the blocking layer 4 is not shown and the opening 43 is shown in FIG. 4, the portion of the heating wire 8 that does not pass through the opening 43 is disposed on the blocking layer 4. This heating wire 8 includes a pair of rectangular terminal portions 81 and 82 that are disposed in the vicinity of the upper edge of the inner glass plate 12 and to which a positive electrode and a negative electrode of a power source are connected. Hereinafter, a terminal portion that is connected to the positive electrode is referred to as a first terminal portion 81, and a terminal portion that is connected to the negative electrode is referred to as a second terminal portion 82. A first wire portion 83 extends downward from the first terminal portion 81 and extends along one side edge (the left side in FIG. 4) of the opening 43 in the blocking layer 4. This first wire portion 83 extends to the vicinity of the lower end of the opening 43. On the other hand, a second wire portion 84 extends downward from the second terminal portion 82 and extends to the vicinity of the upper end of the other side edge (the right side in FIG. 4) of the opening 43.

Also, a third wire portion 85 is disposed between the lower end of the first wire portion 83 and the lower end of the second wire portion 84. The third wire portion 85 is formed in an S-shape by linking five linear parts together. Here, these five parts will be referred to as first, second, third, fourth, and fifth parts 85a to 85e in the stated order starting from the first wire portion 83 side. Specifically, the first, third, and fifth parts 85a, 85c, and 85e are disposed so as to extend across the opening 43, and these parts constitute main body portions according to the present invention. Also, these first, third, and fifth parts 85a, 85c, and 85e refer to portions located in the opening 43. Also, these three parts 85a, 85c, and 85e are inclined at an angle α of 30 degrees or less with respect to the horizontal direction. This is because, if the heating wire 8 extends in the horizontal direction when images of the outside of the vehicle are taken by a camera and image processing is performed, for example, the heating wire 8 blocks all of the pixels on a scanning line extending in the horizontal direction. Also, the windshield is installed in an inclined state, and thus if the heating wire is disposed at an angle that is larger than 30 degrees with respect to the horizontal direction, the inclination of the heating wire may be emphasized to appear larger, which may hinder the ability to acquire information.

Also, these parts are configured such that the second part 85b links the first and third parts 85a and 85c together, and the fourth part 85d links the third and fifth parts 85c and 85e together. These second and fourth parts refer to portions of the third wire portion 85 located on the outer side of the opening 43, and constitute the linking portion of the present invention. Also, these second and fourth parts 85b and 85d each include a linear portion that extends along an edge portion of the opening 43 and a bent portion that links two ends of linear portions and is bent inward of the opening 43. Furthermore, a portion of the lower end portion of the above-described first wire portion 83 that is linked to the fifth part 85e, and a portion of the lower end portion of the second wire portion 84 that is linked to the first part 85a are provided with bent portions that are bent inward of the opening 43. Note that, as shown in an enlarged view of FIG. 4, a bent portion is constituted by a vertex portion S1 and two heating wires 8 that extend from the vertex portion S1. When the distance of one of the heating wires 8 from the vertex portion S1 to the opening 43 is D (the position thereof is S2), and the position of the other heating wire 8 that is located only the distance D away from the vertex portion S1 is S3, a region from S2 to S3 is defined as a bent portion.

As described above, the heating wire 8 is constituted by the first terminal portion 81, the first wire portion 83, the second wire portion 84, the third wire portion 85, and the second terminal portion 82 that are connected in series to the power source (constant voltage). Also, heat is generated by applying a current, and thus it is possible to prevent the opening 43 from fogging up, and to remove fog that has occurred.

There is no particular limitation on the width of the heating wire 8, and the width of the first, third, and fifth parts 85a, 85c, and 85e that are located in the opening 43 is preferably 50 to 1000 μm, and more preferably 200 to 500 μm. Note that portions located in the opening 43 can be seen from the outside of the vehicle. That is, if the blocking layer 4 is layered on a surface on a vehicle interior side of the inner glass plate 12 and a surface on the vehicle interior side of the outer glass plate 11, for example, even if the heating wire 8 is disposed on a portion of at least one of these surfaces that corresponds to the blocking layer 4, the portions of the parts that can be seen from the outside of the vehicle preferably have a width such as that described above. Hereinafter, this portion may be referred to as an "exposed portion".

On the other hand, the second and fourth parts 85b and 85d, the first wire portion 83, and the second wire portion 84 that are located outside the opening 43 preferably have a width of 50 to 5000 μm, and more preferably has a width of 200 to 100 μm so as to be concealed by the blocking layer 4. Hereinafter, this portion may be referred to as a "concealed portion".

Although the first, third, and fifth parts 85a, 85c, and 85e that are located in the opening 43 are arranged substantially in parallel to each other, the interval therebetween is preferably 1.2 times or more the width of the first, third, and fifth parts 85a, 85c, and 85e. The same also applies to a case where parts of the heating wire 8 located in the opening 43 are parallel to each other, and if parallel portions are provided in the opening 43, it is preferable to set an interval therebetween as described above.

Figure 5:
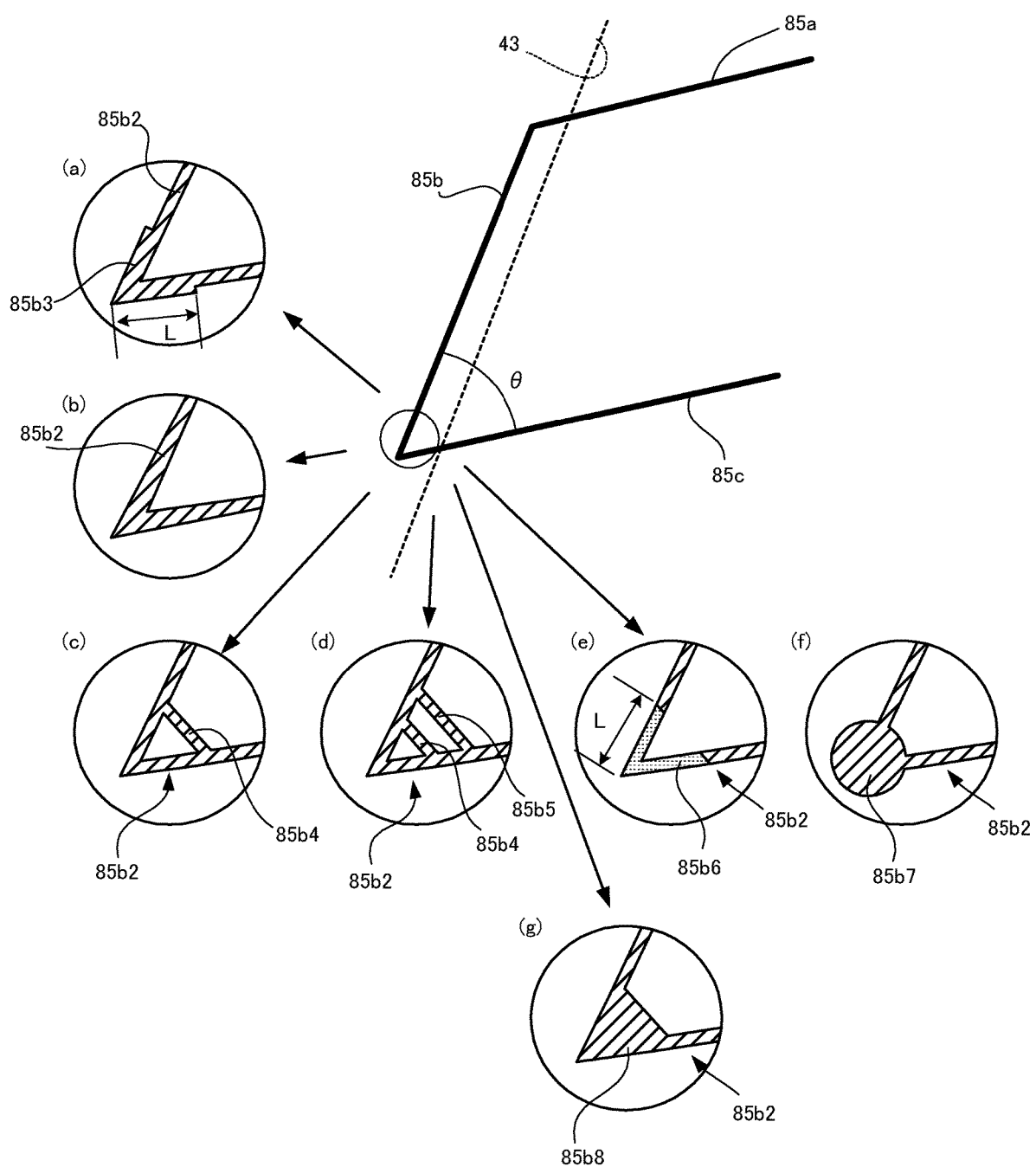
FIG. 5 is a plan view showing an example of a bent portion of the heating wire.

Also, the heating wire 8 preferably has a thickness of 1 to 40 μm, for example, and more preferably has a thickness of 3 to 20 μm. However, the resistance value per unit length of the above-described bent portion is smaller than the resistance value per unit length of the first, third, and fifth parts 85a, 85c, and 85e, thus suppressing heat generation. As a measurement therefor, the width and the thickness of the heating wire 8 can be made different from those of the other portions at the bent portion. The following describes measures for suppressing heat generation at the bent portion, including the adjustment of the width and the thickness thereof, with reference to FIG. 5. FIG. 5 is an example in which the first to third parts 85a to 85c of the heating wire are extracted, and illustrates a lower bent portion of the second part 85b as an example. However, an example of this bent portion is applicable to at least one other bent portion.

4-1. Aspect 1 of Bent Portion

With the aspect shown in FIG. 5(a), a bent portion 85b2 is provided with a wide portion 85b3 whose width is larger than that of the other portion of the heating wire 8. The wide portion 85b3 is formed over a predetermined length L in a heating wire that extends from the vertex portion of the bent portion 85b2 in two directions. More specifically, the inner edge portion of the bent portion 85b2 is linear, and a step is formed at the outer edge portion thereof, thus forming the wide portion 85b3. By providing a wide portion at the bent portion 85b2 in this manner, the resistance of the heating wire 8 is smaller than that of the other portion, and thus it is possible to suppress locally high temperatures at the bent portion 85b2. The width of the wide portion 85b3 is larger than the width of the other portion of the heating wire 8, and is preferably 0.05 to 5.0 mm, more preferably 0.3 to 1.0 mm, even more preferably 0.3 to 0.7 mm, and particularly preferably 0.4 to 0.5 mm, for example. Also, the width of the wide portion 85b3 is preferably 1.2 times or more the width of the other portion thereof, more preferably 1.5 times or more, and particularly preferably 2.0 times or more the width of the other portion. On the other hand, the width of the wide portion 85b3 is preferably 3 times or less the width of the other portion thereof.

Although there is no particular limitation on the length L, the length L is preferably 1 to 20 mm, for example, more preferably 5 to 15 mm, and particularly preferably 5 to 10 mm. However, the width and the length L of the wide portion 85b3 can be changed as appropriate according to required resistance. Note that the width of the wide portion 85b3 can be made larger than that of the other portion by providing a step at an inner edge portion of the bent portion 85b2 or providing steps at both an outer edge portion and an inner edge portion.

4-2. Aspect 2 of Bent Portion

With the aspect shown in FIG. 5(b), the width of the bent portion increases toward the vertex portion of the bent portion 85b2. With this configuration, the resistance of the bent portion 85b2 is also smaller than the resistance of the other portion of the heating wire 8, and thus it is possible to suppress locally high temperatures. Note that the width of the bent portion in this case can be the width of a portion having the largest width, and the length L of a portion whose width changes can be set to the length specified in 4-1.

4-3. Aspect 3 of Bent Portion

With the aspect shown in FIG. 5(c), a bypass heating wire 85b4 for linking inner edge portions of the two heating wires 8 constituting the bent portion 85b2 is provided. Accordingly, the current flowing through the bent portion is dispersed to the bypass heating wire 85b4, and it is possible to suppress locally high temperatures at the vertex portion of the bent portion 85b2. Note that there is no particular limitation on the number of bypass heating wires, and as shown in FIG. 5(d), it is also possible to provide two bypass heating wires 85b4 and 85b5, for example.

4-4. Aspect 4 of Bent Portion

With the aspect shown in FIG. 5(e), the width of the bent portion 85b2 is constant, but a portion 85b6 having a predetermined length that includes the vertex portion is thicker, and the resistance of this portion 85b6 is smaller than the resistance of the other portion of the heating wire 8. This makes it possible to suppress locally high temperatures in the vicinity of the vertex portion of the bent portion 85b2. The thickness of this portion is preferably 1.2 to 40 μm, and more preferably 4.5 to 30 μm, for example. Also, the thickness of this portion is preferably 1.2 times or more, more preferably 1.5 times or more, and particularly preferably 2.0 times or more the thickness of the other portion thereof. However, if the thickness is excessively large, the amount of ink for printing will be too large and the ink will spread, and the heat generation suppression effect will decrease. Therefore, the thickness of this portion is preferably 3 times or less the thickness of the other portion. Note that the length L of a thick portion can be the same as that described in 4-1 above.

4-5. Aspect 5 of Bent Portion

With the aspect shown in FIG. 5(f), the vertex portion of the bent portion 85b2 is provided with a conductive portion 85b7 whose outer diameter is larger than the width of the heating wire 8. In this example, a circular conductive portion is formed. This makes it possible to reduce the resistance of the vertex portion of the bent portion 85b2. As a result, it is possible to suppress locally high temperatures in the vicinity of the vertex portion of the bent portion 85b2. A triangular conductive portion 85b8 can also be formed between two heating wires constituting the bent portion 85b2 as a single body with these heating wires. Note that there is no particular limitation on the shape of the conductive portion, and the conductive portion may have various shapes such as an elliptical shape, a polygonal shape, or an irregular shape. Also, there is no particular limitation on the maximum outer diameter of the conductive portion, and the maximum outer diameter thereof is preferably 10 mm or less.

4-6. Other Aspects of Bent Portion

In order to reduce the amount of heat generated at the bent portion, the bent portion may be configured as follows, in addition to the above-described configurations. Although it depends on the position where the bent portion is formed, an angle θ formed by two heating wires that extend from the vertex portion of the bent portion is preferably large, for example, and can be 15 degrees or more, for example. This makes it possible to increase the distance between the two heating wires 8, and to suppress heat generation. Also, although there is no particular limitation on the angle θ formed by the two heating wires 8, in order to make the region where the heating wires 8 are arranged smaller, the angle θ is preferably 60 degrees or less, and more preferably 45 degrees or less.

Also, the bent portion can be formed in an arc shape in order to eliminate a sharp portion from the bent portion. In this case, the radius of curvature of the bent portion can be 1 to 10 mm, for example. This is because, if the radius of curvature of the bent portion is smaller than 1 mm, locally high temperatures may occur as described above, whereas if the radius of curvature thereof is larger than 10 mm, an arc portion may enter the opening 43, it may not be possible to form a portion extending across the opening 43 with only a straight line, and the appearance thereof may deteriorate. Note that the radius of curvature is measured using a line passing through the center of the heating wire 8 in the width direction.

Although the aspects of the bent portion have been described above, at least one or more of the above-described aspects can be combined as appropriate.

Next, the material of the heating wire 8 and a method for manufacturing the heating wire 8 will be described. The heating wire 8 can be made of various materials as long as it is a conductive material, and silver, copper, or the like can be used, for example. Also, in addition to silver or copper being used alone, it is possible to adopt a layer structure in which the heating wire 8 is coated with a coating member with at least one layer. If the heating wire 8 is directly layered on the inner glass plate 12 instead of on the blocking layer 4, for example, a dark ceramic layer that is similar to the blocking layer 4 can be formed on the glass plate 1 as a coating member, and a heating wire 8 made of silver can also be formed thereon. As a result, the silver heating wire 8 cannot be seen from the outside of the vehicle, which improves the appearance thereof. In particular, if this ceramic layer and the blocking layer 4 have the same color, the appearance as seen from outside of the vehicle would appear natural. Furthermore, the heating wire 8 can also be held between coating members. That is, it is also possible to form a three layer structure in which the coating member is disposed on the glass plate 12, the heating wire 8 is disposed thereon, and a coating member is disposed so as to cover the heating wire 8. As a result, the heating wire 8 cannot be seen from the vehicle interior side. In particular, it is not preferable that a silver layer is exposed from the opening 43 through which light passes because it may interfere with the passage of light, such as reflecting light. Therefore, if a dark ceramic layer is formed on the silver layer as a coating member, the silver layer cannot be seen from the vehicle interior side. Also, the heating wire 8 is disposed on a surface on the vehicle interior side of the glass plate 1, and thus a bracket may be attached to the heating wire 8 via an adhesive. In this case, a component of the adhesive may corrode the silver. Therefore, from this viewpoint as well, as a result of silver being coated with a ceramic layer, it is possible to prevent silver from being affected by the adhesive.

The layer structure that includes such a heating wire 8 can have various aspects. The above-described terminal portions 81 and 82 can be formed of two layers (a ceramic layer and a silver layer are layered in the stated order from the glass plate side), the wire portions 83, 84, and 85 can be formed of three layers (a ceramic layer, a silver layer, and a ceramic layer are layered in the stated order from the glass plate side), and only the third wire portion 85 passing through the opening 43 in the blocking layer 4 can be formed of only a silver layer, for example. Note that the width of the coating material is preferably larger than that of the heating wire. Also, the coating materials with which a silver layer or a copper layer is coated may be any material other than a ceramic material.

As described above, when the heating wire 8 is disposed, the blocking layer 4 can be disposed on a different surface of the laminated glass. It is possible to form the blocking layer 4 on the inner surface side of the outer glass plate 11, and to form the heating wire on the inner surface of the inner glass plate 12, for example. Alternatively, it is also possible to dispose the heating wire 8 between the outer glass plate 11 and the inner glass plate 12, for example, in the interlayer 13, or so as to be in contact with at least one of the glass plates 11 and 12.

A heating wire 8 such as that described above can be disposed on the glass plate using various methods. The heating wire 8 can be formed by molding the inner glass plate 12 (or the outer glass plate 11, the same applies the following), and forming a wire on the inner glass plate 12 through screen printing or the like and firing in the same manner as for the blocking layer 4, for example. If the blocking layer 4 is formed on the same surface of the inner glass plate 12, printing and firing can be performed simultaneously, together with the blocking layer 4. In addition, it is also possible to form the blocking layer on the inner glass plate 12 through transfer.

5. Method for Manufacturing Windshield

Next, a method for manufacturing a windshield will be described. First, the blocking layer 4 is layered on the inner glass plate 12 formed in a predetermined shape. Then, these glass plates 11 and 12 are shaped to be curved. Although there is no particular limitation on the method therefor, known press-molding can be used, for example. Alternatively, once the outer glass plate 11 and the inner glass plate 12 have been placed on each other in a mold, the mold is heated by passing the mold through a heating furnace. Accordingly, the glass plates 11 and 12 can be curved under their own weight.

After the outer glass plate 11 and the inner glass plate 12 are molded in this manner, a laminate is formed in which the interlayer 13 is interposed between the outer glass plate 11 and the inner glass plate 12. Note that the interlayer 13 is larger than the glass plates 11 and 12.

Then, the laminate is placed into a rubber bag, and preliminarily bonding is carried out at about 70° C. to 110° C. under vacuum suction. Preliminary bonding can be carried out using a method other than this method, and the following method can also be adopted. The above-described laminate is heated in an oven at 45° C. to 65° C., for example. Subsequently, this laminate is pressed by a roll at 0.45 to 0.55 MPa. Then, the laminate is heated in an oven again at 80° C. to 105° C., and is then pressed again by a roll at 0.45 to 0.55 MPa. Preliminary bonding is completed in this manner.

Then, permanent bonding is performed. The preliminarily bonded laminate is permanently bonded using an autoclave at a pressure of 8 to 15 atm and at 100° C. to 150° C., for example. Specifically, permanent bonding can be performed under the conditions of 14 atm of pressure and a temperature of 135° C., for example. The interlayer 13 is bonded to the glass plates 11 and 12 through preliminary bonding and permanent bonding described above. Then, the interlayer 13 that protrudes from the outer glass plate 11 and the inner glass plate 12 is cut off.

Then, the heating wire 8 is formed on the inner surface of the inner glass plate 12 using the above-described method.

6. Features 6-1

According to the above-described windshield, it is possible to obtain the following effects. First, by layering the heating wire 8 on the opening 43 in the blocking layer 4, it is possible to prevent the opening 43 from fogging up. Thus, when images of the outside of the vehicle are captured by the imaging device 2 via the opening 43, it is possible to prevent issues with image capturing due to the inner glass plate 12 being fogged up in the opening 43.

In particular, an upper portion that is located inside the vehicle and is provided with the opening 43 in the blocking layer 4 is likely to be cool and fog up even if a heating device is on. Therefore, it is advantageous that the heating wire 8 is layered at such a position. Also, the imaging device 2 is disposed opposite to the opening 43 in the blocking layer 4 on which the heating wire 8 is layered, or the opening 43 is surrounded by the bracket 6. Therefore, there is an issue that warm air from a heating device or a defroster is unlikely to reach the opening 43. Therefore, as described above, it is of great significance to provide an antifog and thaw function using an antifog film or the like to a region that warm air is unlikely to reach.

6-2

Also, if local heat generation is likely to occur as in the bent portion, the current value needs to be controlled by setting the temperature of the portion to the upper limit of the heating temperature (e.g., 70° C. to 80° C.). This is because the glass plate may crack when the glass plate is heated to a temperature higher than the upper limit of the heating temperature, and as a result, production yield may also decrease. However, if a current is controlled such that the portion where local heat generation occurs is heated at the upper limit of the heating temperature, the heating temperature of the other portion may decrease. As a result, there is an issue that the current value cannot be controlled such that the entire heating wire 8 sufficiently generates heat. In view of this, in this embodiment, the bent portion is configured as the aspects 1 to 5 such that local heat generation does not occur. This makes it possible to prevent local heat generation and to control the current value such that the entire heating wire 8 can sufficiently generate heat. As described in the following Examples, by adjusting the configuration of the bent portion, it is possible to set the difference between the temperature of the vertex portion of the bent portion and the average temperature of two portions that are located 35 mm away from the vertex portion of the bent portion to be less than 15° C., for example.

Note that, although it is conceivable that the amount of heat dissipation per unit area of the glass plate can be suppressed by forming the vertex portion of the bent portion in an arc shape, this limits the shape of the bent portion to an arc shape. In view of this, as described above, in this embodiment, even if the bent portion is not formed in an arc shape, for example, the amount of heat dissipation per unit area of the glass plate can be suppressed by employing a configuration such as that shown in the aspects 1 to 5, for example. However, with the aspects 1 to 5, if the bent portion is formed in an arc shape, it is possible to further reduce the amount of heat dissipation.

6-3

In particular, the resistance value per unit length of the bent portion in the embodiments is smaller than the resistance value per unit length of the first, third, and fifth parts $85a$, $85c$, and $85e$, thus suppressing heat generation. Therefore, in order to suppress heat generation, the bent portion need not be formed in an arc shape, and even if the bent portion is a sharp corner portion, it is possible to suppress heat generation, for example. However, if the bent portion is formed in an arc shape, it is possible to further suppress heat generation.

7. Modified Examples

Although embodiments of the present invention have been described above, the present invention is not limited to the above-described embodiments, and various modifications can be carried out without departing from the gist of the invention. Note that the following modified examples can be combined as appropriate.

7-1

The configurations of the heating wire in the embodiments are merely examples, and can have various aspects. That is, the wiring shape and length of the heating wire can be set as appropriate, and the relationship with the opening 43 in the blocking layer 4 can be set as appropriate, and the shapes of the opening in the blocking layer 4 described in the embodiments and the configurations of the heating wire 8 can be combined as appropriate.

Although there is no particular limitation on the number of heating wires (corresponding to the main body portions according to the present invention) that pass through the opening 43, in order to prevent the opening portion from fogging up, the number of heating wires is preferably 3 to 50, for example. This is because, if the number of heating wires 8 passing through the opening 43 is one, for example, fog cannot be sufficiently removed. Also, in order to sufficiently remove fog using one heating wire 8, the temperature of the heating wire 8 needs to be increased. However, an increase in the temperature of the heating wire 8 may cause the glass plate to crack. Therefore, it is preferable to set the number of heating wires passing through the opening 43 as described above. From a similar viewpoint, the total area of the heating wire passing through the opening 43 is preferably 2500 mm$^2$ or more.

7-2

Figure 6:
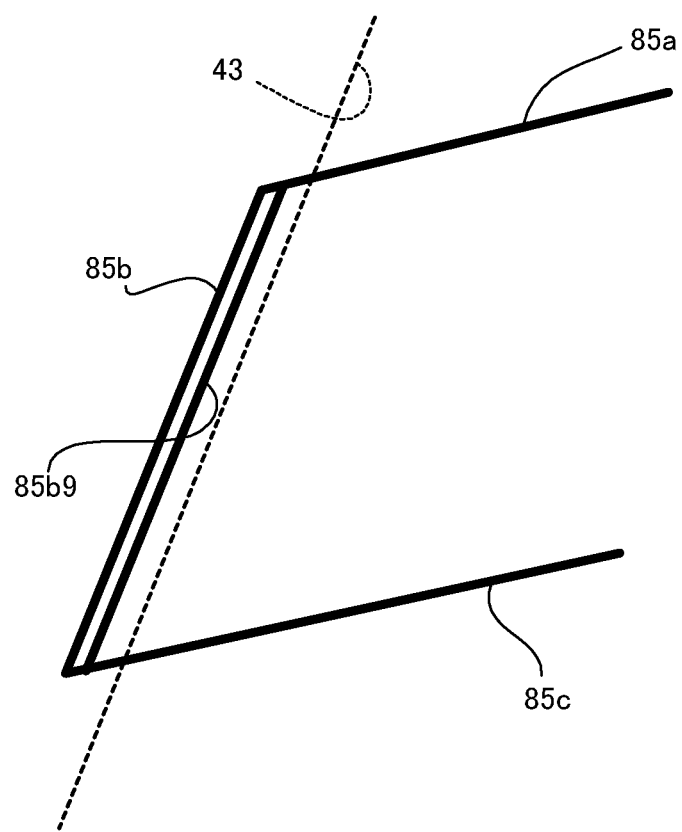
FIG. 6 is a plan view showing another example of the heating wire.

Not all of the bent portions necessarily need to be configured to reduce the amount of heat generated, and some bent portions may be configured as in the embodiments. Also, the resistance per unit length of at least one of the second part $85b$ and the fourth part $85d$ of the first wire portion 83, the second wire portion 84, and the third wire portion 85 that do not directly contribute to preventing the glass plate corresponding to the opening 43 from fogging up can be made smaller than the resistance per unit length of the first part $85a$ and the third part $85c$. In this case, a portion other than the bent portion can have a small resistance value by increasing the width or thickness thereof. Alternatively, as shown in FIG. 6, the resistance of the entire second part $85b$, that is, the resistance per unit length of the second part $85b$, can be reduced by providing one or more bypass heating wires $85b9$ that extend in parallel with the linear portion of the second part $85b$, for example. Such a bypass heating wire $85b9$ can also be provided in parts other than the second part $85b$.

7-3

Figure 7:
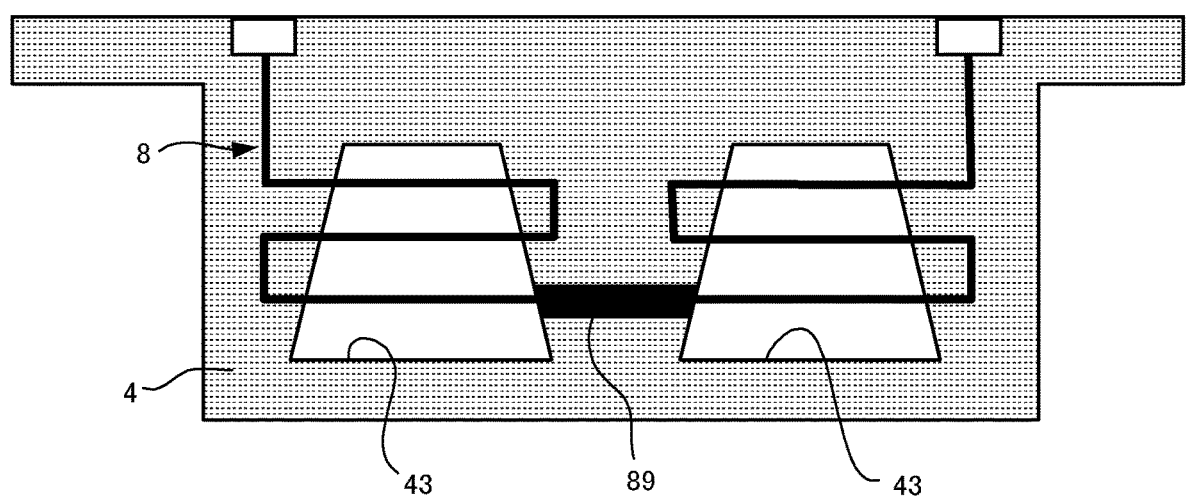
FIG. 7 is a plan view showing an opening and another example of the heating wire.
Figure 8:
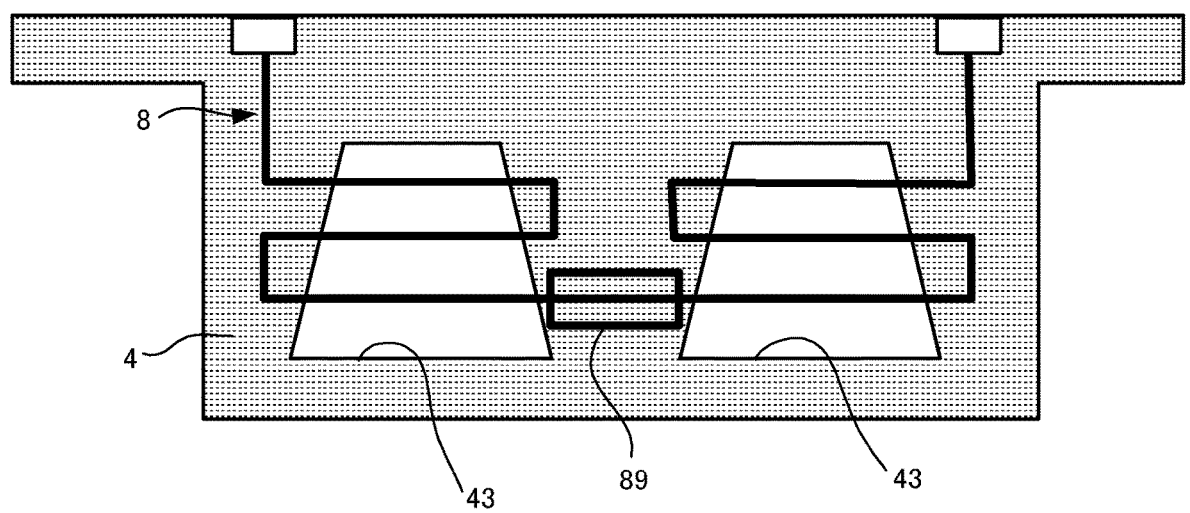
FIG. 8 is a plan view showing an opening and another example of the heating wire.

Two or more openings can also be formed in the blocking layer 4. In this case, as shown in FIG. 7, it is possible to dispose a heating wire 8 in series over two openings 43, for example. In the example shown in FIG. 7, the amount of heat generated is reduced by increasing the width of a portion 89 of the heating wire 8 between the two openings 43 and reducing the resistance thereof. In the example shown in FIG. 8, the amount of heat generated is similarly reduced by providing a parallel heating wire in the portion 89 of the heating wire between the two openings 43 and reducing the resistance thereof. If a plurality of openings 43 are provided in this manner, the resistance value of the heating wire 8 that extends over the openings 43 can be reduced, and various methods described above such as increasing the thickness can be applied, for example.

7-4

Furthermore, although the heating wire 8 is formed in series in the embodiments, a parallel circuit can also be configured in a similar manner. That is, with a parallel circuit, the portions passing through the openings constitute the main body portions according to the present invention, and the portion outside the openings constitutes a partial linking portion for linking the main body portions together. A bent portion formed at the linking portions need only be configured as described above.

7-5

A portion or the entirety of the blocking layer 4 may be constituted by a blocking film that is attachable to the glass plate, and the field of view from the outside of the vehicle may be blocked by the blocking film. Note that a blocking film can be attached to a surface on the vehicle exterior side of the inner glass plate 12 before preliminary bonding or after permanent bonding.

Also, from the viewpoint of preventing a path of light in image capturing (images to be captured or the like) in the glass plate from fogging up, the blocking layer is not always required, and it is sufficient that the heating wire 8 is formed in a region through which light passes (information acquisition region).

7-6

In the embodiments, the imaging device is used as the information acquisition device of the present invention, but there is no limitation to this, and various information acquisition devices can be used. That is, there is no limitation as long as the information acquisition device emits and/or receives light in order to acquire information from the outside of the vehicle. Various devices can be used such as a sensor for measuring an inter-vehicular distance, a visible light and/or infrared camera for measuring an inter-vehicular distance, a light-receiving apparatus configured to receive signals from the outside of a vehicle, such as an optical beacon, and a camera that is configured to use visible light and/or infrared rays and read white lines and the like on a road in an image. Also, the number of openings in the blocking layer 4 can be changed as appropriate according to the type of information acquisition device. It is possible to emit and/or receive light through a dedicated opening, for example. Note that the information acquisition device may or may not be in contact with the glass plate. In either case, the heating wire is formed in a region of the glass plate through which light from the information acquisition device passes (information acquisition region).

EXAMPLES

Hereinafter, examples of the present invention will be described. However, the present invention is not limited to the following examples.

Figure 9A:
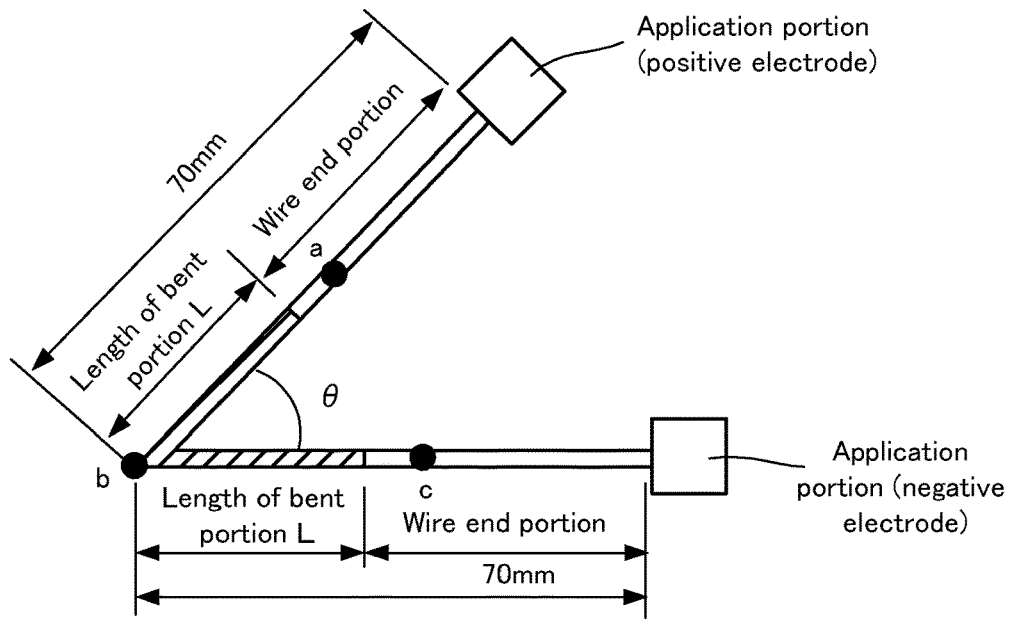
FIG. 9A is a schematic diagram showing a basic structure of a linking portion according to Examples 1 to 11.
Figure 9B:
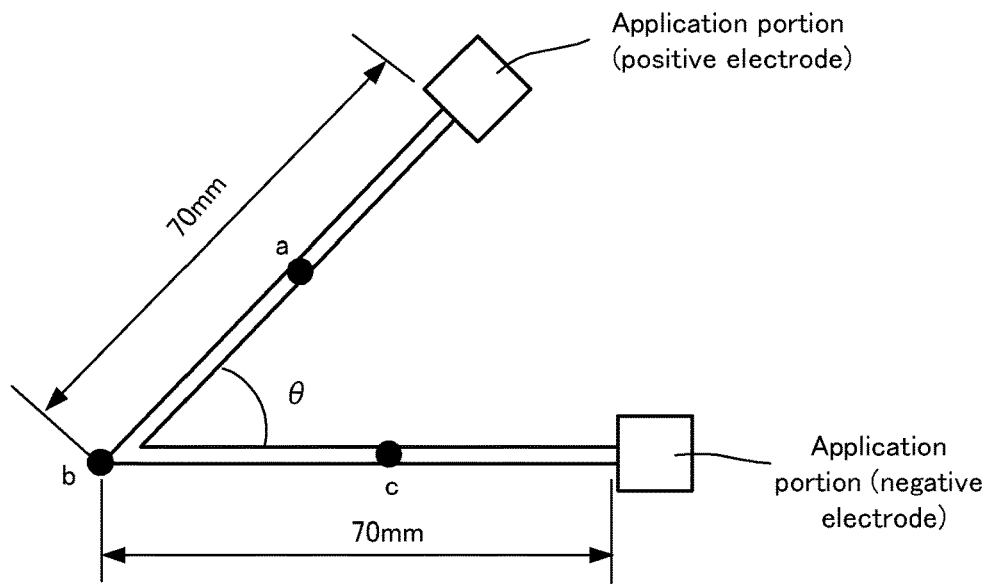
FIG. 9B is a schematic diagram showing a structure of a linking portion according to a comparative example.

Hereinafter, Examples 1 to 11 in which the structures of linking portions of the present invention are different from each other were produced. FIG. 9A shows basic structures of Examples 1 to 11, FIG. 9B shows a structure of a comparative example, and the total length thereof was 140 mm. Bent portions that correspond to any of the above-described aspects 1 to 5 were provided in the basic structures of Examples 1 to 11 shown in FIG. 9A, whereas no bent portion such as that in the examples was provided in the structure of the comparative example shown in FIG. 9B. The linking portions of these Examples 1 to 11 differ from each other in the width of the bent portions, the width of portions other than the bent portions (referred to as wire end portions hereinafter), the thickness of the bent portions, the length of the bent portions, the presence/absence of bypass heating wires, and the presence/absence of conductive portions. Also, vertex portions of the bent portions of Examples 1 to 11 and a comparative example had an acute angle (angle θ=45 degrees), and were not formed in an arc shape (the radius of curvature is 0). Also, all of the wire end portions had a thickness of 6 μm.

All of the linking portions according to Examples 1 to 11 and the comparative example were formed through silver printing on a square green glass having a thickness of 2 mm and 125 mm sides. Also, square and silver print application portions with 10 mm sides were provided at both ends of each linking portion.

A voltage applied to an application portion was adjusted based on the resistance values measured at both application portions for the linking portions according to Examples 1 to 11 and the comparative example such that their heating values were constant. Here, the target heating value was 25 W/m. The heating value of the entire linking portion was 3.5 W (25 W/m*0.14 m). Also, the period of time for which a voltage was applied was 5 minutes. Table 2 below shows resistance values, the temperatures of glass plates before a voltage was applied, and the applied voltages for Examples 1 to 11 and the comparative example.

TABLE 2

|  | Glass Temperature (° C.) | Applied Voltage (V) |
| --- | --- | --- |
| Ex. 1 | 24.2 | 2.6 |
| Ex. 2 | 24.7 | 2.8 |
| Ex. 3 | 23.8 | 2.8 |
| Ex. 4 | 23.9 | 2.9 |
| Ex. 5 | 23.9 | 2.8 |
| Ex. 6 | 23.9 | 2.6 |
| Ex. 7 | 24.1 | 2.8 |
| Ex. 8 | 24.1 | 2.8 |
| Ex. 9 | 24.4 | 2.7 |
| Ex. 10 | 24.5 | 2.7 |
| Ex. 11 | 24.7 | 2.7 |
| Comp. Ex. | 23.7 | 2.8 |

The specifications of the linking portions according to Examples 1 to 11 and the comparative example are as follows. Examples 1 to 6 differ from each other in the length of the bent portions and the width of wire end portions (see FIG. 5(a), for example). Examples 7 and 8 differ from each other in the thickness of the bent portions and the thickness of wire end portions (see FIG. 5(e) for example). With Examples 9 and 10, bypass heating wires were provided (see FIGS. 5(c) and 5(d), for example). With Example 11, a 1 mm circular conductive portion was provided (see FIG. 5(f), for example). On the other hand, with the comparative example, a bent portion such as that in the examples was not provided, and the bent portion and the wire end portion were formed as a single body, and these portions had the same width and the same thickness.

TABLE 3

|  | Width of Bent Portion | Width of Wire End Portion | Thickness of Bent Portion | Length L of Bent Portion | No. of Bypass Heating Wire | Conductive Portion |
| --- | --- | --- | --- | --- | --- | --- |
| Ex. 1 | 0.36 mm | 0.3 mm | 6 μm | 5 mm | — | — |
| Ex. 2 | 0.5 mm | 0.3 mm | 6 μm | 5 mm | — | — |
| Ex. 3 | 0.7 mm | 0.3 mm | 6 μm | 5 mm | — | — |
| Ex. 4 | 0.7 mm | 0.3 mm | 6 μm | 1 mm | — | — |
| Ex. 5 | 0.7 mm | 0.3 mm | 6 μm | 3 mm | — | — |
| Ex. 6 | 0.7 mm | 0.3 mm | 6 μm | 20 mm | — | — |
| Ex. 7 | 0.3 mm | 0.3 mm | 8 μm | 5 mm | — | — |
| Ex. 8 | 0.3 mm | 0.3 mm | 13 μm | 5 mm | — | — |
| Ex. 9 | 0.3 mm | 0.3 mm | 6 μm | — | 1 | — |
| Ex. 10 | 0.3 mm | 0.3 mm | 6 μm | — | 2 | — |
| Ex. 11 | 0.3 mm | 0.3 mm | 6 μm | — | — | Circular |
| Comp. Ex. | 0.3 mm | 0.3 mm | 6 μm | — | — | — |

With regard to Examples 1 to 11 and the comparative example described as described above, the temperatures of the heating wires at positions indicated by reference signs a, b, and c shown in FIGS. 9A and 9B were measured. Reference sign b indicates the vertex portion of the bent portion, and reference signs a and c indicate points on the linking portion that are located 35 mm away from reference sign b. Also, as for each of the Examples 1 to 18, an average temperature s of the temperatures taken at a and c, the temperature taken at b, and a temperature difference dT therebetween were each calculated. The results are as follows.

TABLE 4

|  | Temperature at b | Temperature Difference dT |
| --- | --- | --- |
| Ex. 1 | 62.8 | 14.5 |
| Ex. 2 | 60.9 | 8.8 |
| Ex. 3 | 61.8 | 7 |
| Ex. 4 | 62.0 | 7.7 |
| Ex. 5 | 58.6 | 4.3 |
| Ex. 6 | 49.3 | −13.8 |
| Ex. 7 | 53.2 | −1.0 |
| Ex. 8 | 49.9 | −5.2 |
| Ex. 9 | 55.3 | −2.4 |
| Ex. 10 | 52.1 | −0.3 |
| Ex. 11 | 65.8 | 11.1 |
| Comp. Ex. | 65.9 | 20.2 |

According to the above results, with all of the examples, the temperature difference dT was less than 15° C. Therefore, with Examples 1 to 11, it was found that there were no locally hot spots in the entire linking portion, an appropriate heating temperature was ensured even at a position (e.g., reference signs a and c) away from reference sign b, which indicates the vertex portion of the bent portion where the temperature is likely to increase. Therefore, it was found that, even if a control is performed such that the upper limit of the heating temperature is 70° C. to 80° C., for example, it is possible to suppress locally high temperatures and to cause the entire linking portion to sufficiently generate heat. On the other hand, with the comparative example, the temperature difference dT exceeded 15° C., and the temperature of the linking portion was likely to be uneven overall.

As shown in the results of Examples 6, the temperature at reference sign b can be reduced by making the width of the bent portion larger than the width of the wire end portion and increasing the length of the bent portion. Also, as shown in the results of Examples 8, the temperature at reference sign b can be reduced by increasing the thickness of the bent portion and the thickness of the wire end portion. Furthermore, as with Examples 9 and 10, effects of reducing the temperature at reference sign b were obtained by providing a bypass heating wire.

LIST OF REFERENCE NUMERALS

1 Glass plate
2 Imaging device (information acquisition device)
4 Blocking layer
43 Opening (information acquisition region)
8 Heating wire

The invention claimed is:

1. A windshield on which an information acquisition device that acquires information from outside of a vehicle by emitting and/or receiving light is disposable, the windshield comprising:
 a glass plate; and
 a heating wire that is provided on the glass plate and to which a current is applied,
 wherein the glass plate includes at least one information acquisition region that faces the information acquisition device and through which the light passes,
 the heating wire includes a plurality of linear main body portions that pass through at least the information acquisition region and a linear linking portion for linking the plurality of main body portions, and
 at least one of the linking portions includes a heat generation suppressing means for suppressing heat generation when a current is applied.

2. The windshield according to claim 1,
 wherein at least one of the linking portions includes at least one bent portion as the heat generation suppressing means, and
 a resistance value of the bent portion per unit length is smaller than a resistance value of the main body portions per unit length.

3. The windshield according to claim 1,
 wherein, as the heat generation suppressing means, a resistance value of the linking portion per unit length is smaller than a resistance value of the main body portions per unit length.

4. The windshield according to claim 1,
 wherein at least one of the linking portions includes at least one bent portion, and at least one of the linking portions includes at least one bypass heating wire.

5. The windshield according to claim 2,
 wherein the width of at least a portion of the bent portion is larger than the width of a portion of the linking portion other than the bent portion.

6. The windshield according to claim 2,
 wherein the thickness of at least a portion of the bent portion is larger than the thickness of a portion of the linking portion other than the bent portion.

7. The windshield according to claim 2,
 wherein an angle formed by the heating wire that constitutes the bent portion is 15 to 60 degrees.

8. The windshield according to claim 2,
 wherein the bent portion has a length of 1 to 20 mm.

9. The windshield according to claim 2,
 wherein the width of the bent portion is 1.2 times or more the width of a portion of the linking portion other than the bent portion.

10. The windshield according to claim 2,
 wherein at least a portion of the bent portion has a width of 0.3 to 1.0 mm.

11. The windshield according to claim 2,
 wherein the thickness of the bent portion is 1.2 times or more the thickness of a portion of the linking portion other than the bent portion.

12. The windshield according to claim 2,
 wherein the bent portion is formed in an arc shape.

13. The windshield according to claim 2,
 wherein the bent portion is provided with a conductive portion whose outer diameter is larger than the width of the heating wire constituting the bent portion.

14. The windshield according to claim 1,
 wherein the plurality of main body portions are disposed substantially parallel to each other, and
 the interval between the main body portions is 1.2 times or more the width of the heating wire.

15. The windshield according to claim 1,
 wherein the number of main body portions is 3 to 50.

16. The windshield according to claim 1,
 wherein the total area of the plurality of main body portions is 2500 $mm^2$ or more.

17. The windshield according to claim 1,
 wherein each main body portion is inclined at an angle $\alpha$ of 30 degrees or less with respect to a horizontal direction.

18. The windshield according to claim 1,
 wherein at least one of the linking portions includes at least one bent portion as the heat generation suppressing means, and
 a temperature difference dT defined at the bent portion is less than 15° C.,
 where dT is |b−s|, s is an average temperature of two portions of the heating wire that are located 35 mm away from a vertex portion of the bent portion, and b is the temperature of the heating wire at the vertex portion.

* * * * *